(12) United States Patent
Klatt et al.

(10) Patent No.: US 12,539,584 B2
(45) Date of Patent: Feb. 3, 2026

(54) TORQUE SCREWDRIVER

(71) Applicant: HAZET-WERK Hermann Zerver GmbH & Co. KG, Remscheid (DE)

(72) Inventors: Patrick Klatt, Hagen (DE); Christian Ballsieper, Remscheid (DE)

(73) Assignee: HAZET-WERK HERMANN ZERVER GMBH & CO. KG, Remscheid (DE)

( * ) Notice: Subject to any disclaimer, the term of this patent is extended or adjusted under 35 U.S.C. 154(b) by 0 days.

(21) Appl. No.: 18/833,085

(22) PCT Filed: Dec. 16, 2022

(86) PCT No.: PCT/DE2022/100965
§ 371 (c)(1),
(2) Date: Jul. 25, 2024

(87) PCT Pub. No.: WO2023/143660
PCT Pub. Date: Aug. 3, 2023

(65) Prior Publication Data
US 2025/0050478 A1    Feb. 13, 2025

(30) Foreign Application Priority Data
Jan. 26, 2022   (DE) .................... 20 2022 100 447.1

(51) Int. Cl.
*B25B 23/142*    (2006.01)
*B25B 23/14*    (2006.01)

(52) U.S. Cl.
CPC ........ *B25B 23/1427* (2013.01); *B25B 23/141* (2013.01)

(58) Field of Classification Search
CPC . B25B 23/1427; B25B 23/141; B25B 23/142; B25B 23/1425; B25B 23/1422;
(Continued)

(56) References Cited

U.S. PATENT DOCUMENTS 6,047,801 A    4/2000   Liao
9,421,675 B2   8/2016   Yu
(Continued)

FOREIGN PATENT DOCUMENTS

CN    201198123 Y  *  2/2009
CN    103358265 A    10/2013
(Continued)

OTHER PUBLICATIONS

Machine translation DE102010018581_A1 (Year: 2011).*
(Continued)

*Primary Examiner* — Monica S Carter
*Assistant Examiner* — Jonathan R Zaworski
(74) *Attorney, Agent, or Firm* — HAUPTMAN HAM, LLP

(57) ABSTRACT

A torque screwdriver includes a handle and a display for a torque which has been set, and has an output. A setting device for setting a torque and a torque mechanism in the handle, the torque mechanism including a driveshaft for transmitting a torque and a release mechanism for interrupting a transmission of torque when a torque which has been set is reached. The driveshaft and the output are coupled via a freewheel mechanism.

17 Claims, 8 Drawing Sheets

(58) Field of Classification Search
CPC ... B25B 23/1405; B25B 23/14; B25B 23/145; B25B 23/147; B25B 23/16; B25B 23/0035; B25B 15/04; B23B 31/10; B23B 31/02
USPC .......................................................... 81/473
See application file for complete search history.

(56) References Cited

U.S. PATENT DOCUMENTS

| | | | |
|---|---|---|---|
| 10,040,179 B2* | 8/2018 | Peters | B23B 31/10 |
| 2006/0048610 A1 | 3/2006 | Hu | |
| 2012/0132042 A1* | 5/2012 | Bruce | B25B 23/1425 |
| | | | 81/479 |
| 2012/0326399 A1* | 12/2012 | Lin | B25B 23/0057 |
| | | | 279/75 |
| 2014/0312577 A1* | 10/2014 | Schneider | B23B 31/1071 |
| | | | 279/22 |
| 2014/0352502 A1 | 12/2014 | Lai | |
| 2015/0090078 A1 | 4/2015 | Yu | |
| 2019/0344369 A1* | 11/2019 | Lin | B23G 1/28 |
| 2021/0308843 A1 | 10/2021 | Abel, Jr. | |

FOREIGN PATENT DOCUMENTS

| | | | | |
|---|---|---|---|---|
| CN | 112166010 | A | 1/2021 | |
| DE | 2503372 | A1 | 7/1975 | |
| DE | 29800921 | U1 | 3/1998 | |
| DE | 19707798 | A1 | 9/1998 | |
| DE | 19963237 | A1 | 6/2001 | |
| DE | 102010018581 | A1 * | 10/2011 | ............. B25B 15/04 |
| DE | 102005034114 | B9 | 1/2013 | |
| DE | 102013009358 | A1 | 12/2014 | |
| DE | 102014115089 | A1 | 4/2016 | |
| DE | 202017102507 | U1 | 7/2017 | |
| EP | 0661139 | B1 | 3/1999 | |
| EP | 1502708 | A1 * | 2/2005 | ......... B25B 23/1427 |
| GB | 1501391 | A | 2/1978 | |
| JP | 2011-189428 | A | 9/2011 | |
| TW | 202019629 | A | 6/2020 | |
| WO | 9838011 | A1 | 9/1998 | |
| WO | 2013143258 | A1 | 10/2013 | |

OTHER PUBLICATIONS

Machine translation cn 201198123 (Year: 2009).*
Machine translation EP1502708A1 (Year: 2011).*
International Search Report and Written Opinion of International Application No. PCT/DE2022/100965 mailed Mar. 7, 2023; 15pp.
Office Action for Taiwanese Application No. 111149620 mailed Aug. 31, 2023; 11pp.
International Preliminary Report on Patentability for International Application No. PCT/DE2022/100965 mailed Aug. 29, 2023; 11pp.
Office Action for Chinese Application No. 202280058674.X mailed Jul. 31, 2024; 14pp.
Office Action, Japanese Application No. 2024-516712, mailed Nov. 27, 2024, 5pp.

* cited by examiner

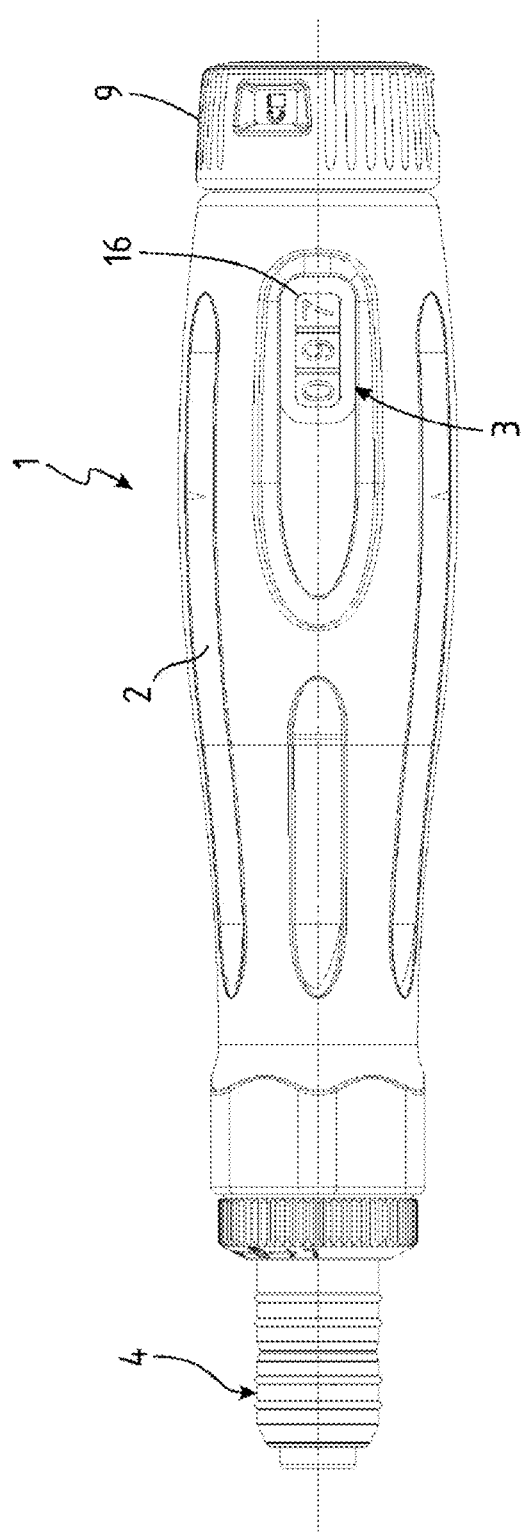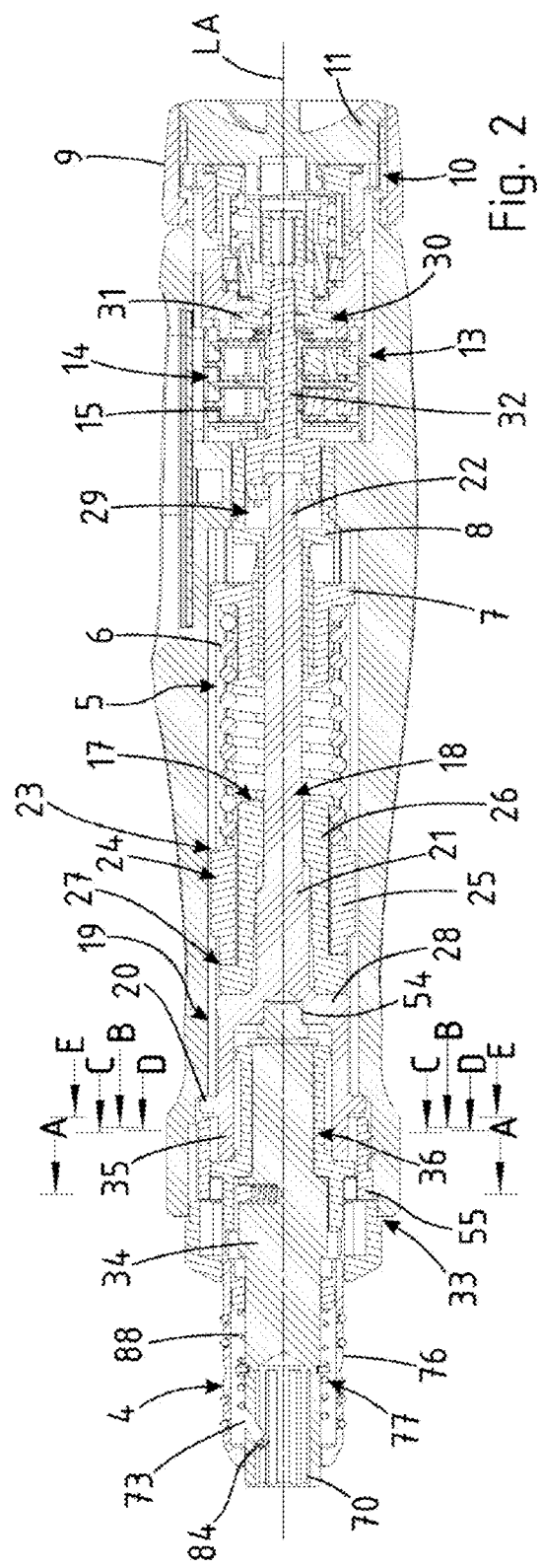

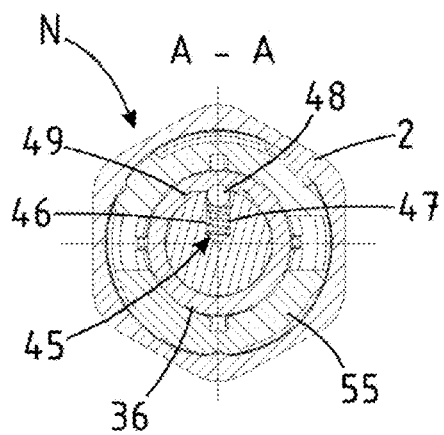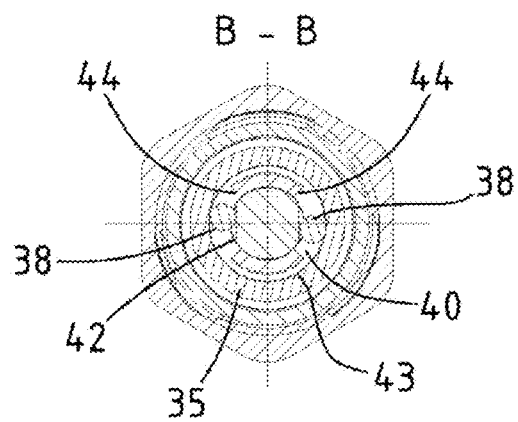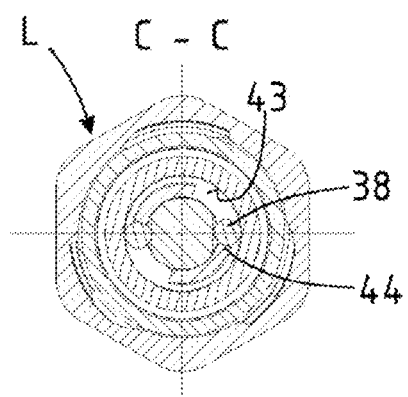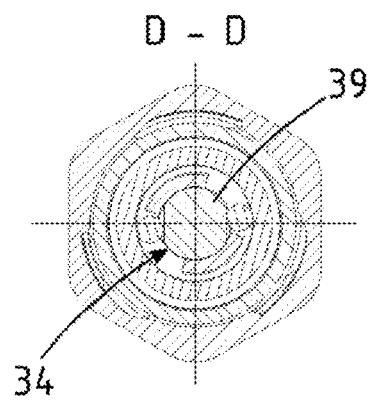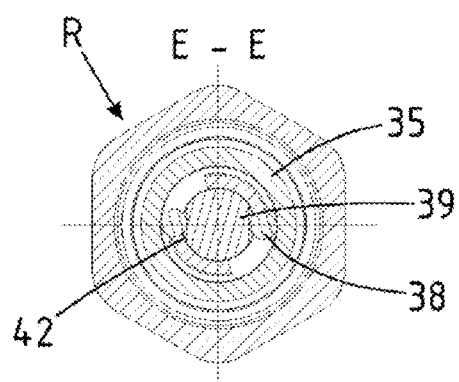

TORQUE SCREWDRIVER

RELATED APPLICATIONS

The present application is a National Phase of International Application Number PCT/DE2022/100965 filed Dec. 16, 2022, and claims priority of German Application Number 20 2022 100 447.1 filed Jan. 26, 2022.

FIELD

The present disclosure relates to a torque screwdriver.

BACKGROUND

Torque tools such as torque screwdrivers are manually-operated tools using which a controlled torque is able to be exerted on a workpiece, for example, a screw or a nut. A defined tightening torque is able to be exerted using settable torque tools in order to ensure the required clamping force or assembly pre-tension between the components to be connected.

In torque screwdrivers, a trigger mechanism is housed in the handle. A setting device including displays for a torque to be set is also provided in the handle or on the handle. The desired torque is set by compression of a compression spring, by rotating the compression spring using an adjusting body connected to an adjusting mechanism, for example, a threaded spindle, relative to a fixed part of the handle.

A settable torque screwdriver is described in U.S. Pat. No. 9,421,675 B2.

DE 298 00 921 U1 and EP 0 661 139 B1 describe ratchet screwdrivers.

A switchable torque screwdriver is described in DE 10 2005 034 114 B9.

The above-mentioned torque screwdrivers operate using a switchable ratchet mechanism in order to be able to transmit a rotational force in one rotational direction whereas no force is transmitted in the opposite rotational direction, but rather the ratchet rotates idly. Such mechanical ratchet mechanisms have a reverse resistance due to the system, which makes itself noticeable upon rotation in reverse. The level of the reverse resistance varies depending on the design of the ratchet mechanism. A resistance-free reverse is not possible with known mechanisms. The reverse resistance has a disadvantageous effect when tightening or pre-tightening loose screw connections, since the tightening torque of the screws is often less than the reverse resistance. As a result, the ratchet mechanism does not function in the case of such applications. Comparable problems result with screw connections having very low tightening torques, since the tightening torque is able to be lower than the reverse resistance therein.

In the switchable screwdriver described in DE 25 03 372 A1, a rotational force transmission by means of rollers is provided. The switching of the rotational direction takes place via a control unit. The rollers interact with the shaft and an internal hole of the hilt of screwdriver, so that in case of a torque transmission, the rollers wedge in a rotational direction settable by the control unit and a torque is able to be transmitted in one rotational direction. A rotational direction reversal is carried out by an adjustment by means of the control unit.

A design for setting the torque on a torque screwdriver is part of the prior art due to DE 10 2013 009 358 A1. A setting device for setting a torque and a torque mechanism are arranged in the handle, wherein the torque mechanism comprises a driveshaft for transmitting a torque and a trigger mechanism for interrupting a torque transmission upon reaching a set torque.

A screwing tool having a direction-switchable freewheel block is described in DE 197 07 798 A1.

Furthermore, a settable torque screwdriver is also disclosed in US 2015/0090078 A1.

SUMMARY

The present disclosure is based on the object of improving a torque screwdriver with respect to application and functionally.

The achievement of this object according to the present disclosure is a torque screwdriver.

Embodiments and modifications of features of the torque screwdriver, which embodied the present disclosure in a technically advantageous manner individually or in combination, result from the description and the appended drawings.

The torque screwdriver includes a handle and a display for a set torque and an output. A setting device for setting a torque and a torque mechanism are arranged in the handle. The torque mechanism includes a drive shaft for transmitting a torque and a trigger mechanism for interrupting the torque transmission upon reaching a set torque.

The trigger mechanism of the torque screwdriver includes a clutch which interrupts the torque transmission upon reaching a set torque. The clutch includes a first clutch part and a second counter clutch part, which are coupled in a formfitting manner via gear teeth. The first clutch part interacts with the second counter clutch part and is loaded by the compression spring. The first clutch part and the second counter clutch part are coupled in a formfitting manner via gear teeth. The teeth are designed as helical and have a helical tooth contour. As soon as a counter torque is applied at the output and this is transmitted to the drive side, the two clutch elements move away from one another along the contact surfaces at the teeth. This movement takes place against the spring force of the compression spring, wherein the torque introduced at the handle and the counter torque are identical in absolute value. From a set torque (trigger torque), the first clutch part and the second counter clutch part have moved far enough apart that the form fit between the two parts is canceled. The introduction of a higher torque at the output is thus prevented and the gear teeth engage in the following position. If the torque introduced at the handle is not reduced, this process repeats. The process is only interrupted when the torque at the handle is less than the trigger torque.

By increasing or reducing the spring force of the compression spring, the desired trigger torque of the trigger mechanism at the clutch is able to be changed proportionally. This adjustment is carried out by a rotational movement of the adjusting screw.

According to the present disclosure, the driveshaft and output are coupled via a freewheel mechanism. The freewheel mechanism is configured and intended for the purpose of transmitting or supporting a torque in one rotational direction, whereas the freewheel mechanism permits a rotational movement (freewheeling) in the opposite direction. Due to the design according to the present disclosure of a torque screwdriver having the freewheel mechanism, the return resistance is eliminated or almost completely eliminated upon the reverse rotation of the handle. The freewheel mechanism enables a resistance-free reverse upon re-gripping. Upon actuation in the tightening direction, the freewheel mechanism locks in a self-inhibiting manner and transmits the torque. The functionality according to the present disclosure enables the tightening of untightened screws or nuts. Screw connections in which a very low tightening torque is required are able to advantageously be established using the torque screwdriver according to the present disclosure.

According to the present disclosure, the freewheel mechanism includes an inner shaft, an outer ring, a switching cage, and at least one clamping body. The clamping body is a clamping rollers. The switching cage is arranged on a shaft section of the inner shaft. The clamping body is arranged in a recess in a cylinder section of the switching cage. The outer ring is at least indirectly connected to the driveshaft. The outer ring is advantageously integrally formed from the same material that the output-side end of the driveshaft. A circumferential ring shoulder is provided on the outer circumference of the outer ring. This interacts with a stop in a receptacle section of the handle and secures the axial position of the driveshaft in the handle.

The clamping body is arranged between the inner shaft and the outer ring. In a clamping position, the clamping body transmits a torque between the outer ring and the inner shaft. The clamping body is supported on a planar surface of the shaft section and on an inner circumferential surface of the outer ring. During a rotational movement in the freewheeling direction, the clamping body slides on the running surfaces of inner shaft and outer ring.

If a rotational movement of the handle takes place in the tightening direction, a friction lock results due to static friction at the contact surfaces between the planar surface of the shaft section and the inner circumferential surface of the outer ring. The torque is transmitted via the clamping body or bodies. A drive movement with repeated direction change is transmitted step-by-step in a rotational direction in the same direction on the output side or the output in the clamping direction. If the rotational direction changes from the clamping direction to the freewheeling direction, a reset takes place without torque transmission.

The freewheel mechanism is switchable. The torque screwdriver has a neutral setting, in which a torque is transmittable in both rotational directions. In the neutral setting, the torque screwdriver according to the present disclosure operates like a screwdriver. By switching over the freewheel mechanism, the mechanism is able to change between a first clamping setting and a second clamping setting and the tightening direction is able to be set. To switch over the freewheel mechanism, the switching cage is pivotable in relation to the inner shaft and/or the outer ring. The clamping body is thus movable from the neutral setting, in which a torque is transmittable in both rotational directions, into the first clamping setting or the second clamping setting. In the first clamping setting, a torque transmission takes place in one rotational direction (tightening direction). In the second clamping setting, a torque transmission takes place in a second rotational direction (loosening direction). In the respective opposite direction (freewheeling direction) from the first rotational direction or the second rotational direction, no torque transmission takes place in either case. The torque mechanism is able to be rotated in reverse while freewheeling in the freewheeling direction.

In order that the switching cage cannot change its switch setting or the respective clamping setting independently, detent devices are provided, which are configured and intended to secure the position of the switching cage in the neutral setting, the first clamping setting, or the second clamping setting.

In at least one embodiment of the present disclosure, a detent device includes a detent element which is arranged in a radial hole of the inner shaft. The detent element interacts with a spring which is inserted into the radial hole and acts against the detent element so the spring is loaded outward out of the radial hole in a spring-elastic manner. These switching cage includes detents, in which the detent element engages as an abutment in the respective clamping setting or neutral setting. The contour of the detent is adapted to the external geometry of the detent element. In at least one embodiment of the present disclosure, the detent element is a ball.

The freewheel mechanism is switched over via a switching body, which is configured and intended to switch over the switching cage. These switching over is carried out by a rotational movement of the switching body around the longitudinal axis of the torque screwdriver. In at least one embodiment of the present disclosure, the switching body is a switching ring or a switching disk. This is able to be manually actuated. The switching cage is moved into a clamping setting or the neutral setting by rotating the switching body.

In at least one embodiment of the present disclosure, a shoulder, which is supported on a bottom of the outer ring, is provided on the driveshaft-side end section of the inner shaft.

In at least one embodiment of the present disclosure, a pin, which projects into a central hole in the bottom of the outer ring, is provided on the driveshaft-side end section of the inner shaft. In order to prevent a change of the switching status due to occurring torques during use of the freewheel, the shoulder of the inner shaft is supported on the bottom of the outer ring. A friction torque between switching cage and outer ring is thus avoided and switching over is prevented. The pin protruding into the hole in the bottom of the outer ring centers the arrangement and prevents an inclined position.

The axial securing of the freewheel mechanism is carried out by a cover. The cover is arranged on the output side of the switching cage and is secured on or in the handle. The switching cage includes a shoulder body which is supported on the cover.

The cover is inserted into a recess aligned in the output-side end of the handle. The cover is then fastened by a rotational movement relative to the handle. The cover includes a support section. Joining elements, for example, cutting teeth or cutting bars, are provided on the support section. During the rotation of the cover for its installation, the joining elements work themselves into the material of the handle. For the installation order to facilitate the installation process, the cover is able to be provided with engagement surfaces, such as a slot, in which a tool is able to engage. To avoid overtightening, the handle and the cover have interacting stop surfaces. In at least one embodiment of the present disclosure, detent elements are provided on the handle and on the cover so that the connection between handle and cover cannot loosen independently. As the cover is tightened, the cover is secured in a friction-locked and formfitting manner in the front cylinder section of the handle. The handle includes plastic, whereas the cover is manufactured from a metallic material.

In at least one embodiment of the present disclosure, the inner shaft includes an output section, which is able to be coupled with the output or on which the output is formed. The output section is able to be embodied as a polygonal head having a holding system for tools, such as sockets or bit holders. In at least one embodiment of the present disclosure, the output section is able to be designed as a polygonal socket.

The output includes a tool holding system.

In at least one embodiment of the present disclosure, the output section includes a polygonal socket receptacle and a slot oriented transversely to the longitudinal extension of the output section in the area of the polygonal socket receptacle. The tool holding system includes a puller sleeve arranged so the puller sleeve is displaceable to a limited extent on the output section. The puller sleeve is arranged concentrically to the output section and has a front shoulder and a rear plug body. The detent spring has a coiled section and a straight leg. The coiled section of the detent spring engages around the outside of the output section. The coiled section is supported on a ring element. The leg is intended and configured to hold a tool inserted into the hexagon socket receptacle, for example, a bit, as an abutment. The leg of the detent spring engages through the slot in the polygonal socket receptacle. The straight leg of the detent spring is able to engage in a standardized detent groove of a tool, for example, a bit, and fix a bit inserted into the polygonal socket receptacle. A compression spring is arranged on the side of the ring element opposite to the detent spring. The compression spring is provided for preventing play from occurring when a tool, for example, a bit, is inserted into the polygonal socket receptacle. The compression spring has the task of permanently pressing the puller sleeve slightly to the rear. For this purpose, the compression spring acts against the end-side plug of the puller sleeve. The puller sleeve and the plug are compressed with one another and form a fixed unit.

In order to remove a tool from the polygonal socket receptacle, the tool holding system is unlocked. For this purpose, the puller sleeve is retracted. The detent spring is un-lockable by retracting the puller sleeve, in that an inner edge of the front shoulder of the puller sleeve displaces the detent spring upon the retraction, so that the straight leg moves out of the holding position and releases a received tool.

The slot in the output section is directed diagonally to the rear from the inside of the polygonal socket receptacle and extends up to the outside of the output section.

An embodiment which improves the torque screwdriver according to the present disclosure overall with respect to applications and functionally provides that the setting device includes a compression spring that is able to be pretensioned, an adjusting nut, and an adjusting screw. To set a torque, the setting device interacts with an adjusting body pivotable around the longitudinal axis of the handle.

The respective set torque is numerically displayed on the display. For this purpose, a number roller counter mechanism arranged in a hollow-cylindrical longitudinal section of the handle is provided in the torque screwdriver according to the present disclosure.

In at least one embodiment of the present disclosure, an advantageous embodiment of the torque screwdriver includes an adjustment assembly which is integrated, via which an adjustment of the torque setting and is able to be carried out.

BRIEF DESCRIPTION OF THE DRAWINGS

The present disclosure is described in more detail hereinafter on the basis of drawings. In the figures:

FIG. 1 shows a torque screwdriver according to at least one embodiment in a side view;

FIG. 2 shows a longitudinal section to the torque screwdriver according to at least one embodiment;

FIG. 3 shows a section through the illustration of FIG. 2 along line A-A according to at least one embodiment;

FIG. 4 shows a section through the illustration of FIG. 2 along line B-B according to at least one embodiment;

FIG. 5 shows a section through the illustration of FIG. 2 along line C-C according to at least one embodiment;

FIG. 6 shows a section through the illustration of FIG. 2 along line D-D according to at least one embodiment;

FIG. 7 shows a section through the illustration of FIG. 2 along line E-E according to at least one embodiment;

DETAILED DESCRIPTION

Figure 8:
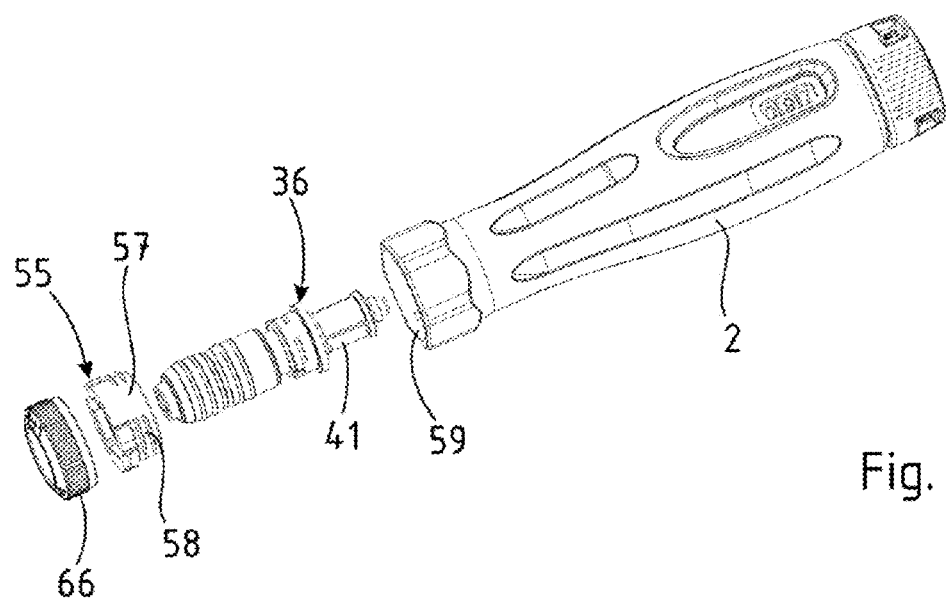
FIG. 8 shows parts of the torque screwdriver in a prospective exploded view according to at least one embodiment.
Figure 9:
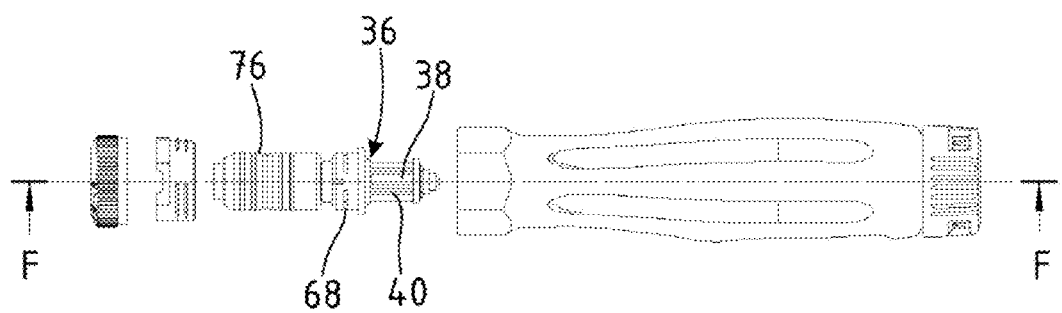
FIG. 9 shows the illustration corresponding to FIG. 8 in a side view according to at least one embodiment.
Figure 10:
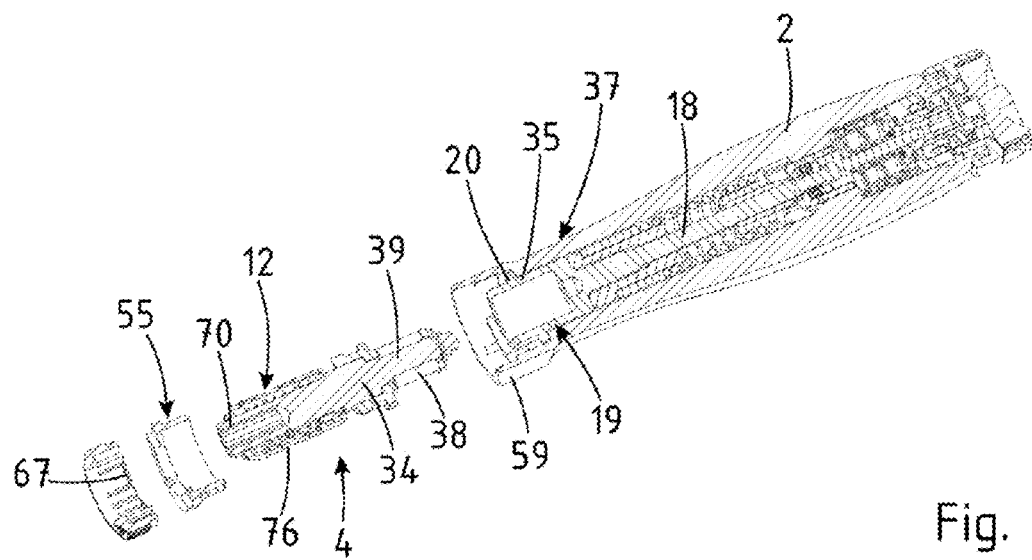
FIG. 10 shows a sectional view through the illustration of FIG. 9 along line F-F in a perspective view according to at least one embodiment.
Figure 11:
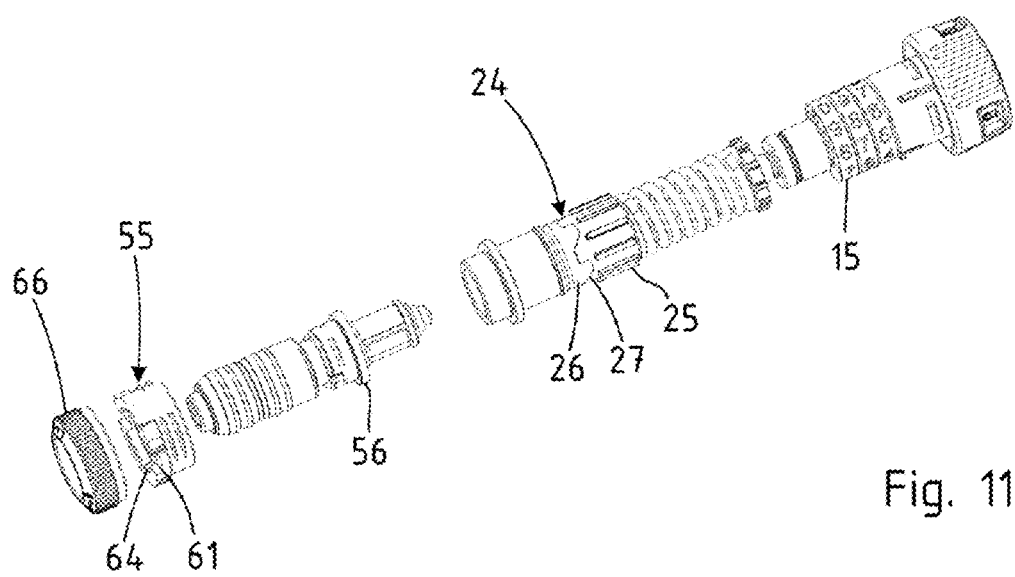
FIG. 11 shows parts of the torque screwdriver in a prospective exploded view without illustration of the handle according to at least one embodiment.
Figure 12:
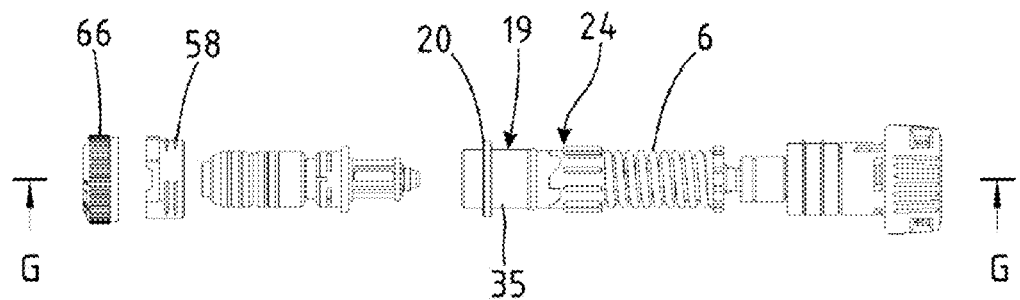
FIG. 12 shows the illustration of FIG. 11 in a side view according to at least one embodiment.
Figure 13:
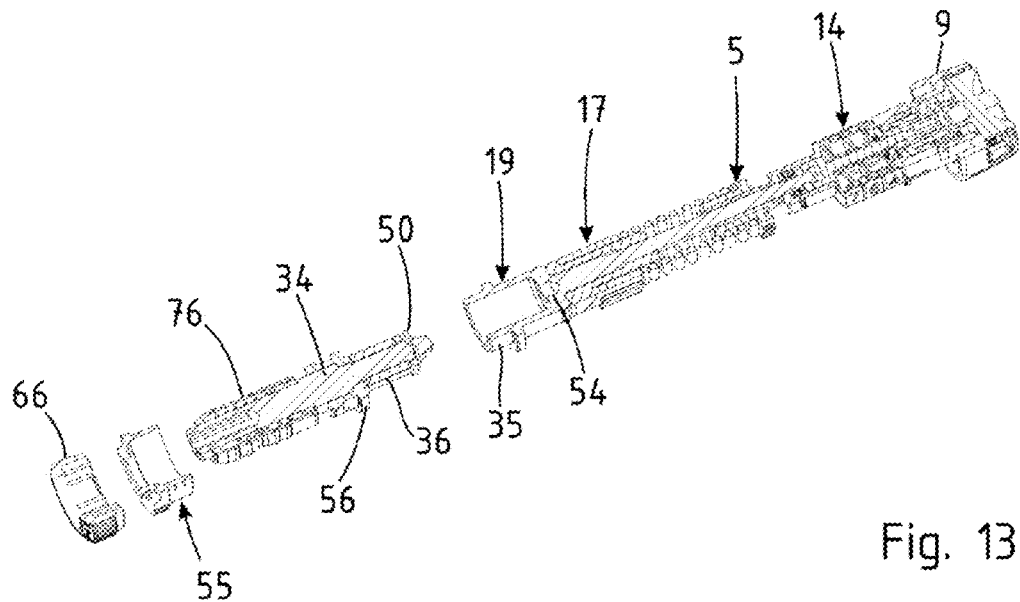
FIG. 13 shows a section to the illustration of the parts according to FIG. 12 along line G-G according to at least one embodiment.
Figure 14:
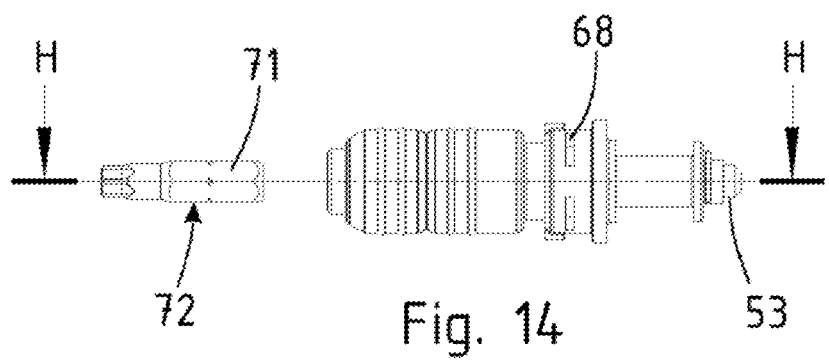
FIG. 14 shows parts of the freewheel mechanism and output in a side view according to at least one embodiment.
Figure 15:
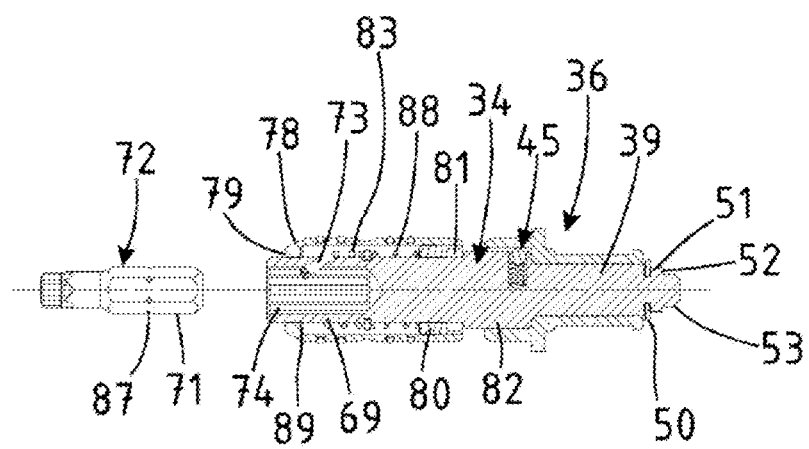
FIG. 15 shows a section to the illustration corresponding to FIG. 14 along line H-H according to at least one embodiment.
Figure 16:
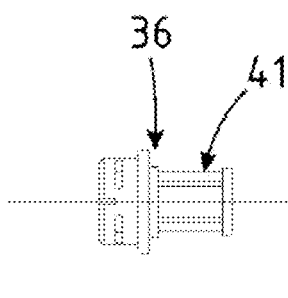
FIG. 16 shows a switching cage in a side view according to at least one embodiment.
Figure 17:
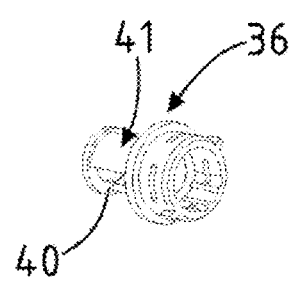
FIG. 17 shows the switching cage in a perspective view diagonally from the front according to at least one embodiment.
Figure 18:
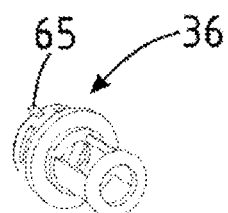
FIG. 18 shows the switching cage in a view from the rear according to at least one embodiment.
Figure 19:
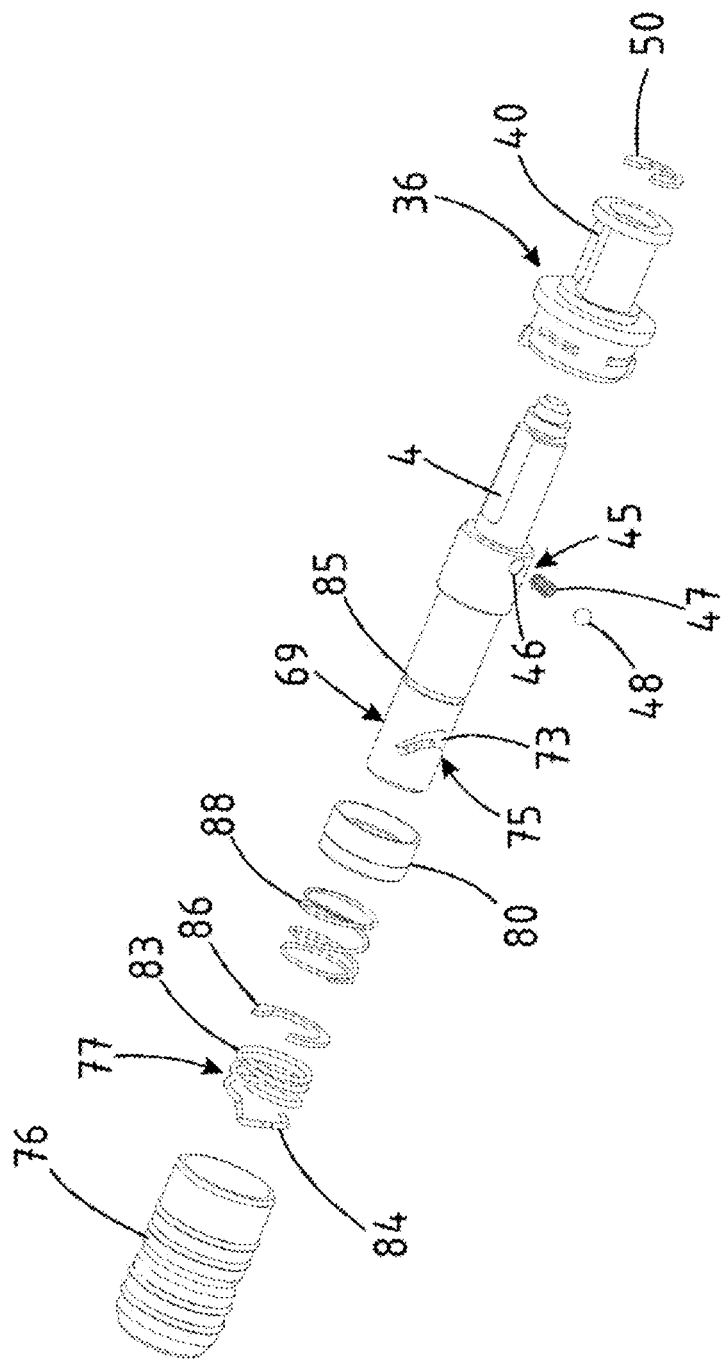
FIG. 19 shows parts of the freewheel mechanism and output in a prospective exploded view according to at least one embodiment.
Figure 20:
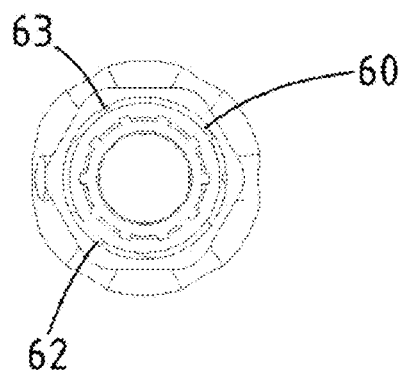
FIG. 20 shows a frontal view of the open side of the output-side end of the handle according to at least one embodiment.
Figure 21:
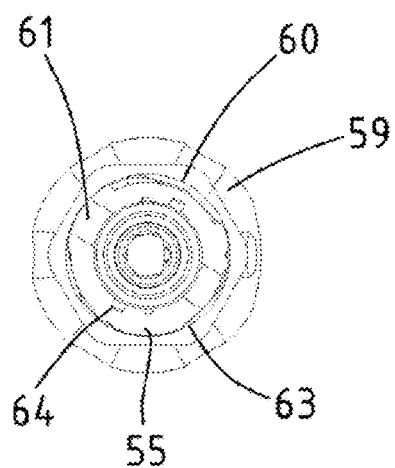
FIG. 21 shows the frontal view of the output-side end of the handle with inserted freewheel mechanism and positioned cover according to at least one embodiment.
Figure 22:
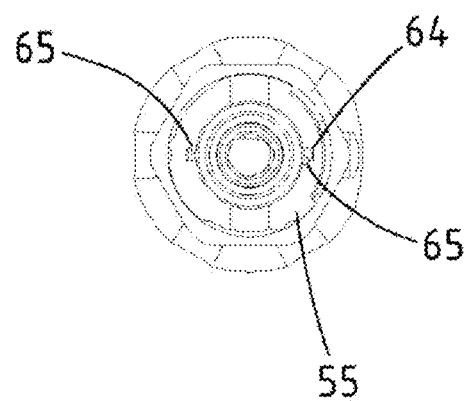
FIG. 22 shows a view corresponding to the illustration of FIG. 21 with cover screwed into the end by rotation according to at least one embodiment.
Figure 23:
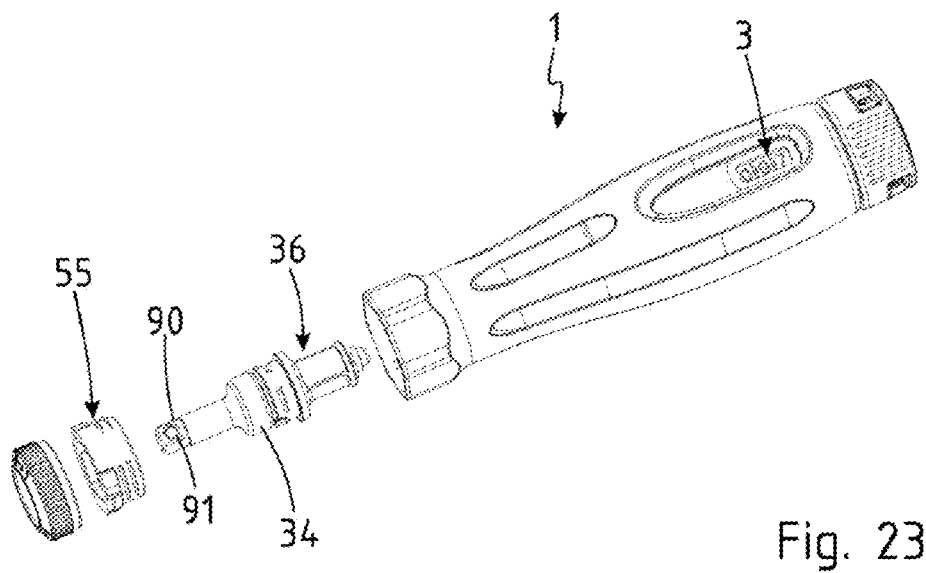
FIG. 23 shows a torque screwdriver in a prospective exploded view according to at least one embodiment.
Figure 24:
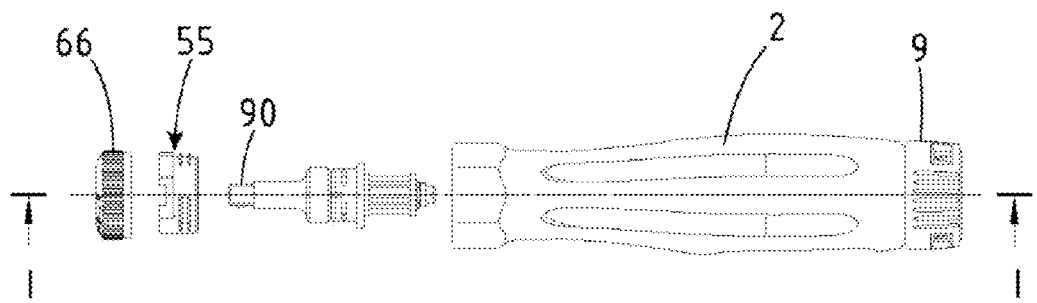
FIG. 24 shows the torque screwdriver according to FIG. 23 in a side view according to at least one embodiment.
Figure 25:
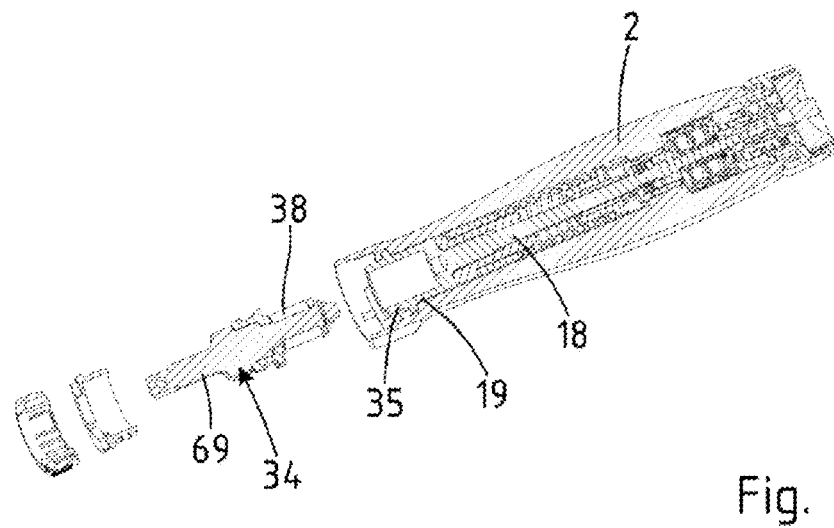
FIG. 25 shows a section through FIG. 24 along line I-I in a perspective according to at least one embodiment.

A torque screwdriver 1 and parts thereof are described on the basis of FIG. 1 to FIG. 22. FIG. 23 to FIG. 25 show a variant of the torque screwdriver 1. The torque screwdriver 1 includes a handle 2 as well as a display 3 for a set torque and an output 4. A setting device 5 for setting a specific torque or a defined trigger torque is integrated in the handle 2. The setting device 5 includes an adjusting mechanism having a compression spring 6 that is able to be pretensioned and is supported on an adjusting nut 7 arranged in a rotationally-fixed manner in the handle 2 and an adjusting screw 8. The desired torque is set by compressing or relaxing the compression spring 6.

The setting device 5 and its adjusting mechanism interact with an adjusting body 9 on the handle 2. The adjusting body 9 is rotatable relative to the handle 2 around its longitudinal axis LA. The torque is set by pivoting the adjusting body 9 relative to the stationary part of the handle 2. To secure the respective set torque against inadvertent adjustment, the adjusting body 9 is secured by means of a lock 10, which is actuated via a locking button 11.

The output 4 of the torque screwdriver 1 is arranged on the end face of the handle 2. The output 4 is designed to accommodate exchangeable tools. For the exchangeable accommodation of different insert tools in the form of bits, the output 4 is equipped with a tool holding system 12 intended for this purpose.

The display 3 for the torque includes a number roller counter mechanism 14, arranged in a hollow-cylindrical longitudinal section 13 of the handle 2, having multiple number rollers 15 arranged one behind the other, which are readable through a viewing window 16 in the handle 2.

The torque transmission from the handle 2 to the output 4 takes place via a torque mechanism 17. The output 4 is coupled with a driveshaft 18 so torque is transmittable. The driveshaft 18 is mounted in the handle 2 and includes an output-side cylinder sleeve 19 having a ring shoulder 20 and a center axial section 21 and an end section 22.

A trigger mechanism 23 having a clutch 24, which interrupts the torque transmission upon reaching a specific trigger torque, is arranged in the handle 2. The clutch 24 includes a first clutch part 25 and a second counter clutch part 26. If a torque is introduced via the handle 2, the torque is transmitted to the clutch part 25. The clutch part 25 interacts with the counter clutch part 26 and is loaded by the compression spring 6. The first clutch part 25 and the second counter clutch part 26 are coupled in a formfitting manner via gear teeth 27. The teeth of the first clutch part 25 and the teeth of the second counter clutch part 26 are designed as helical and have a helical tooth contour. A low surface pressure between the first clutch part 25 and the second counter clutch part 26 is ensured by the helix shape and the helical line predetermined in this way.

The second counter clutch part 26 is radially coupled via a hexagonal connection with the driveshaft 18 and is supported on the bottom 28 of the cylinder sleeve 19. As soon as a counter torque is applied at the output 4 and is transmitted to the driveshaft 18, the first clutch part 25 and the second counter clutch part 26 move apart from one another along the contact surfaces at the teeth. This movement takes place against the spring force of the compression spring 6, wherein the torque introduced at the handle 2 and the counter torque are identical in absolute value. From a set torque, thus from the trigger torque, the first clutch part 25 and the second counter clutch part 26 have moved far enough apart that the form fit between the two parts is canceled. The introduction of a higher torque at the output 4 is thus prevented and the gear teeth 27 engage in the following position. If the torque introduced at the handle 2 is not reduced, this process repeats. The process is only interrupted when the torque at the handle 2 is less than the trigger torque.

By increasing or reducing the spring force of the compression spring 6, the desired trigger torque of the trigger mechanism 23 at the clutch 24 is able to be proportionally changed. This adjustment is carried out by a rotational movement of the adjusting screw 8, which is supported on an axial bearing 29. The axial bearing 29 is used so that the adjustment torque to be applied at the adjusting screw 8 is reduced. When a rotational movement is executed on the adjusting screw 8, the connected adjusting nut 7 moves axially and at the same time changes the pre-tension of the compression spring 6, which is supported on the adjusting nut 7. The thread rotational direction specifies here which affect the respective rotational direction generates. In order that the adjusting nut 7 cannot also rotate upon the rotation of the adjusting screw 8, the adjusting nut 7 is constrained in the handle 2. The adjusting nut 7 is axially displaceable in the longitudinal axis LA.

The torque screwdriver 1 includes a calibrating arrangement 30 having a calibrating clutch 31 and a calibrating shaft 32. A calibration of the trigger torque is able to be performed via the calibrating arrangement 30. In at least one embodiment of the present disclosure, the torque transmission for setting or adjusting the adjusting screw 8 and thus for setting the trigger torque takes place via the calibrating clutch 31 and the calibrating shaft 32. In this way, the setting value displayed on the display 3 via the number roller counter mechanism 14 and the trigger torque are equalized to one another.

The driveshaft 18 and the output 4 are coupled via a freewheel mechanism 33. The freewheel mechanism 33 includes an inner shaft 34 and an outer ring 35 as well as a switching cage 36. The outer ring 35 is part of the cylinder sleeve 19 at the output-side and 37 of the driveshaft 18. The cylinder sleeve 19 having its outer ring 35 and the bottom 28 as well as the ring shoulder 20 are integral parts of the driveshaft 18, made of the same material.

In at least one embodiment of the present disclosure, the freewheel mechanism 33 includes clamping bodies 38 in the form of clamping rollers. Two clamping bodies 38 are provided in the illustrated exemplary embodiment of the torque screwdriver 1.

The switching cage 36 is arranged on a shaft section 39 of the inner shaft 34. The clamping bodies 38 are arranged in recesses 40 in a cylinder section 41 of the switching cage 36. The clamping bodies 38 each support themselves on a planar surface 42 of the shaft section 39. The two planar surfaces 42, which each interact with one clamping body 38, are diametrically opposite on the cylinder section 41. The clamping bodies 38 support themselves on an inner circumferential surface 43 of the outer ring 35 on the outer ring 35.

In a clamping setting, the clamping bodies 38 transmit a torque between the outer ring 35 and the inner shaft 34. No torque is transmitted in the opposite direction. The handle 2 is freewheeling in the opposite direction. A drive rotational movement of the handle 2 with repeated direction change is transmitted step-by-step in a rotational movement in the same direction on the output 4 in the clamping direction in each case.

In a clamping setting R for a right-rotating rotational movement or a clamping setting L for a left-rotating rotational movement, the clamping bodies 38 abut a right or a left contact edge 44 in a recess 40 of the switching cage 36. The right or left contact edge 44 ensures that a state of self-inhibiting occurs and a torque transmission is only possible in one rotational direction, whereas freewheeling is present in the opposite direction. The contact edge 44 reduces the free space of a clamping body 38, so the clamping body 38 does not wedge between inner shaft 34 and outer ring 35. In this rotational direction, the mechanism is able to be rotated in reverse without resistance, due to which comfortable re-gripping is possible. In the opposite direction, the mechanism blocks in a self-inhibiting manner.

In the present exemplary embodiment of the torque screwdriver 1, two clamping bodies 38 are provided. One planar surface 42 is required for each clamping body 38. The two planar surfaces 42 are diametrically opposite to one another on the shaft section 39 at equal distance to the longitudinal axis LA.

The installed switching cage 36 is used to control the self-inhibiting.

The switching cage 36 is able to be put into three switching positions to set three operating settings of the freewheel mechanism 33. The switching positions specify a neutral setting N as well as the first clamping setting R for a right-rotating actuation and the second clamping setting L for a left-rotating actuation.

In the neutral setting N, the switching cage 36 gives the clamping bodies 38 enough freedom that the mechanism blocks in a self-inhibiting manner in each rotational direction to the right and to the left and thus deactivates the freewheel. The torque screwdriver 1 transmits a torque both rotating to the right and rotating to the left. In the two other clamping settings R, L, respectively the right or left contact edge 44 in the recesses 40 of the switching cage 36 ensures that self-inhibiting only still functions in the respective other rotational direction. The contact edge 44 reduces the free space of the clamping bodies 38, so that the clamping bodies 38 do not wedge between inner shaft 34 and outer ring 35. The freewheel mechanism 33 is able to be rotated in reverse without resistance in this rotational direction, which enables comfortable re-gripping. In the opposite direction, the freewheel mechanism 33 blocks in a self-inhibiting manner. The second clamping setting L only changes the adjusting direction or the freewheel direction of the freewheel mechanism 33. The torque screwdriver 1 is able to be set depending on the requirement between right tightening, left tightening, and blocking function in the neutral setting N.

The freewheel mechanism 33 is switchable, wherein the switching cage 36 is pivotable in relation to the inner shaft 34 and the outer ring 35. The clamping bodies 38 are thus moved from the neutral setting N, in which a is transmittable in both rotational directions (rotating to the right or rotating to the left), into the first clamping setting R or into the second clamping setting L. In the first clamping setting R, a torque is transmitted in the first right-rotating rotational direction (tightening direction). In the second clamping setting L, a transmission takes place in the second left-rotating rotational direction (loosening direction). In the respective opposite direction (freewheeling direction) of first rotational direction and second rotational direction, no torque transmission takes place.

In order that the switching cage 36 cannot independently change its respective switching position, detent devices 45 are provided, which are configured and intended to secure the location of the switching cage 36 in the neutral setting N, the first clamping setting R, or the second clamping setting L. A detent device 45 includes a radially arranged hole 46 in the inner shaft 34, in which a detent element 48, loaded by a spring 47, in the form of a ball is located. Detents 49 are provided on the switching cage 36. The detent element 48 and the detents 49 interact. The detent element 48 is able to engage in the respective switching position in a detent 49 on the switching cage 36 and prevent independent switching over. The detents 49 are adapted in configuration to the outer contour of a detent element 48. In at least one embodiment of the present disclosure, the detents 49 are designed as depressions in the form of spherical sections in the switching cage 36. The hole 46, the contact edge is 44, and the detents 49 have to be oriented in location in relation to the planar surfaces 42 of the inner shaft 34. The switching cage 36 is axially secured by means of a lock ring 50, which is arranged in a circumferential groove 51 of the inner shaft 34.

In order to prevent a change of the switching state due to occurring friction torques during use of the torque screwdriver 1, a shoulder 52 of the inner shaft 34 is supported on the bottom 28 of the cylinder sleeve 19. A corresponding friction torque between switching cage 36 and outer ring 35 is thus avoided and switching over is prevented. The shoulder 52 is provided on the driveshaft-side end section of the inner shaft 34. In addition, a pin 53, which plunges into a hole 54 in the bottom 28, is located at the end of the shoulder 52. The task of this pin 53 is to prevent or limit an inclined position between outer ring 35 and inner shaft 34.

The freewheel mechanism 33 is axially secured via a cover 55. The cover 55 itself is fastened in the handle 2. The cover 55 is arranged on the output side of the switching cage 36 and secured on the handle 2 or in the handle 2. The switching cage 36 includes a shoulder body 56, on which the cover 55 is supported. The cover 55 has a support section 57. Joining elements 58 in the form of cutting teeth are provided on the support section 57. These teeth are designed for the friction-locked and formfitting securing of the cover 55 in a front cylinder section 59 of the handle 2. The cover 55 is inserted aligned in a recess 60 provided in the front cylinder section 59. Due to a subsequent rotational movement relative to the handle 2, the joining elements 58 arranged on the outer circumference of the support section 57 work themselves into the material of the handle 2 by screwing. For this purpose, the cover 55 has a slot 61, in which a corresponding tool is able to engage. To avoid overtightening, stop surfaces 62 are provided on the handle 2 and on the cover 55. In addition, detent elements 63 are provided on the handle 2 and on the cover 55 so that the connection cannot loosen independently.

The handle 2 is manufactured from plastic, whereas the cover 55 includes a metallic material.

A groove 64 is provided on the inner diameter of the cover 55. This groove is used to move past lugs 65 of the switching cage 36. The lugs 65 are required to establish a radial connection to a switching body 66. The switching body 66 is embodied as a switching disk. The switching cage 36 is able to be switched over with the aid of the switching body 66, wherein the switching body 66 fulfills two functions. On the one hand, the cover 55 is covered by a switching body 66, on the other hand, the switching body 66 ensures better switching comfort, since the switching body 66 has a larger circumference and is able to additionally be provided with an outer profile. The axial securing of the switching body 66 takes place via detent lugs 67, which engage in corresponding recesses 68 in the switching cage 36.

The inner shaft 34 includes an output section 69, which is able to be coupled with the output 4 or on which the output 4 is formed.

In the torque screwdriver 1 explained on the basis of FIG. 1 to FIG. 22, the output 4 includes a tool holding system 12.

The output section 69 includes a polygonal socket receptacle 70. This is provided to accommodate a polygonal section 71 of a tool 72, of a screwdriver bit. In the area of the polygonal socket receptacle 70, the output section 69 includes a slot 73 oriented transversely to the longitudinal extension of the output section 69. The slot 73 extends oriented diagonally to the rear from the inside 74 of the polygonal socket receptacle 70 to an outer side 75 of the output section 69.

The tool holding system 12 includes a puller sleeve 76 arranged to be displaceable to a limited extent on the output section 69, and a detent spring 77. The puller sleeve 76 has a front shoulder 78 and surrounds the circumference of the front end of the output section 69 with an opening 79. A rear plug body 80 is compressed with and firmly connected to the puller sleeve 76. On the driveshaft side, the plug body 80 has a radial recess 81. Using this recess, the plug body 80 is able to radially engage around a middle section 82 of the inner shaft 34 and is able to be guided in a limited manner via the middle section 82 upon retraction of the puller sleeve 76.

The detent spring 77 has a coiled section 83 and a straight leg 84. The detent spring 77 is guided with the coiled section 83 on the output section 69 and engages around the outside thereof. A ring element 86 in the form of a lock ring is arranged in a groove 85 in the output section 69. The coiled section 83 is supported on the ring element 86. The straight leg 84 extends through the slot 73 into the polygonal socket receptacle 70. The leg 84 is intended and configured to hold a tool 72 inserted into the polygonal socket receptacle 70 like an abutment. The leg 84 of the detent spring 77 engages for this purpose in the standardized detent groove 87 of a tool 72.

A compression spring 88 is arranged on the side of the ring element 86 opposite to the detent spring 77. The compression spring 88 is provided to prevent play from occurring when a tool 72 is inserted into the polygonal socket receptacle 70 and to ensure a gap between a front inner edge 89 of the puller sleeve 76 and the detent spring 77. The compression spring 88 has the task of permanently pressing the puller sleeve 76 slightly to the rear via the plug body 80. The applied spring force is low enough that the detent spring 77 is not influenced thereby.

The detent spring 77 is unlocked by retracting the puller sleeve 76. An inner edge 89 of the puller sleeve 76 retracts the detent spring 77 along the slot 73 and releases a tool 72.

The torque screwdriver 1 shown in FIG. 23 to FIG. 25 include an output 4 having an output section 69, on which a polygonal head 90 is formed. A detent arrangement 91 is integrated on the output section 69 having the polygonal head 90. The output 4 having the polygonal head 90 and the detent arrangement 91 is intended and configured for the purpose of accommodating and driving commercially-available tools, such as drive sockets.

Otherwise, the embodiment of the torque screwdriver 1 having its setting device 5 for setting a torque and the torque mechanism 17 and the freewheel mechanism 33 corresponds to the above-described embodiment.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A torque screwdriver, comprising:
    a handle;
    a display for a set torque;
    an output;
    a setting device to set a torque; and
    a torque mechanism, wherein
    the setting device and the torque mechanism are in the handle,
    the torque mechanism comprises:
        a driveshaft to transmit a torque, and
        a trigger mechanism to interrupt a torque transmission upon reaching the set torque,
    the trigger mechanism comprises a clutch to interrupt the torque transmission upon reaching the set torque,
    the clutch comprises a first clutch part and a second clutch part coupled in a formfitting manner via gear teeth,
    the driveshaft and the output are coupled via a freewheel mechanism, the freewheel mechanism comprising:
        an inner shaft;
        an outer ring;
        a switching cage; and
        at least one clamping body comprising at least one clamping roller,
    the switching cage is on a shaft section of the inner shaft,
    the clamping body is in a recess in a cylinder section of the switching cage,
    the outer ring is at least indirectly connected to the driveshaft,
    the clamping body is configured to transmit the torque between the outer ring and the inner shaft in a clamping setting,
    the inner shaft comprises a shoulder, the shoulder is on a driveshaft-side end section of the inner shaft, and the shoulder is in direct contact with a bottom of the outer ring of a cylinder sleeve, and
    a pin, which protrudes into a central hole in the bottom, is on the driveshaft-side end section of the inner shaft.

2. The torque screwdriver as claimed in claim 1, wherein the clamping body is supported on a planar surface of the shaft section and on an inner circumferential surface of the outer ring.

3. The torque screwdriver as claimed in claim 1, wherein the freewheel mechanism is switchable,
    the switching cage is pivotable relative to at least one of the inner shaft or the outer ring,
    the clamping body is movable from a neutral setting, in which the torque is transmittable in both first and second rotational directions, into a first clamping setting or a second clamping setting,
    in the first clamping setting, a torque transmission occurs in the first rotational direction being a tightening direction,
    in the second clamping setting, a torque transmission occurs in the second rotational direction being a loosening direction, and
    no torque transmission occurs in a respective opposite direction, being a freewheeling direction, of the first rotational direction or the second rotational direction.

4. The torque screwdriver as claimed in claim 3, further comprising:
    detent devices configured to secure a location of the switching cage in the neutral setting, the first clamping setting, or the second clamping setting.

5. The torque screwdriver as claimed in claim 4, wherein the detent devices comprise a detent element in a radial hole of the inner shaft with incorporation of a spring, and detents on the switching cage.

6. The torque screwdriver as claimed in claim 1, further comprising:

a switching body comprising a switching ring or a switching disk, wherein the switching body is configured to switch over the switching cage.

7. The torque screwdriver as claimed in claim 1, wherein the switching cage is axially secured by a lock ring in a groove of the inner shaft.

8. The torque screwdriver as claimed in claim 1, further comprising:
a cover which is on an output side of the switching cage and is secured on the handle, wherein the switching cage comprises a shoulder body supported on the cover.

9. The torque screwdriver as claimed in claim 8, wherein the cover comprises a support section, and
joining elements comprising cutting teeth or cutting bars are on the support section to friction-lock and formfitting secure the cover in a front cylinder section of the handle.

10. The torque screwdriver as claimed in claim 9, wherein the cutting teeth have helical tooth contour to provide low surface pressure between the first clutch part and the second clutch part.

11. The torque screwdriver as claimed in claim 1, wherein the inner shaft comprises an output section which is coupled with the output, or on which the output is formed.

12. The torque screwdriver as claimed in claim 1, wherein the output comprises a tool holding system.

13. The torque screwdriver as claimed in claim 12, wherein
an output section comprises a polygonal socket receptacle and a slot oriented transversely to a longitudinal extension of the output section in an area of the polygonal socket receptacle,
the tool holding system of the output comprises (i) a puller sleeve arranged so as to be displaceable on the output section and (ii) a detent spring,
the puller sleeve comprises a front shoulder and a rear plug body,
the detent spring comprises a coiled section and a straight leg,
the coiled section of the detent spring engages around an outside of the output section, and is supported on a ring element,
the straight leg extends through the slot into the polygonal socket receptacle,
the straight leg is configured to hold a tool insertable into the polygonal socket receptacle as an abutment,
a compression spring is on a side of the ring element opposite to the detent spring,
the puller sleeve engages around the detent spring and the compression spring,
the compression spring abuts the rear plug body, and
the detent spring is unlockable by retracting the puller sleeve so an inner edge of the front shoulder displaces the detent spring so the straight leg releases the tool.

14. The torque screwdriver as claimed in claim 13, wherein the slot extends obliquely backwards from an inner side of the polygonal socket receptacle up to an outer side of the output section.

15. The torque screwdriver as claimed in claim 1, wherein
the setting device comprises a compression spring configured to be pre-tensioned, an adjusting nut, and an adjusting screw, and
the setting device is configured to interact with an adjusting body, which is rotatable around a longitudinal axis of the handle, to set a torque.

16. The torque screwdriver as claimed in claim 1, wherein the display comprises a number roller counter mechanism in a hollow-cylindrical longitudinal section of the handle.

17. The torque screwdriver as claimed in claim 1, further comprising:
a calibrating assembly, via which a calibration of the torque setting is to be performed.

* * * * *